Dec. 15, 1931.  A. W. MEYER  1,836,541
PERCOLATOR
Filed May 19, 1930
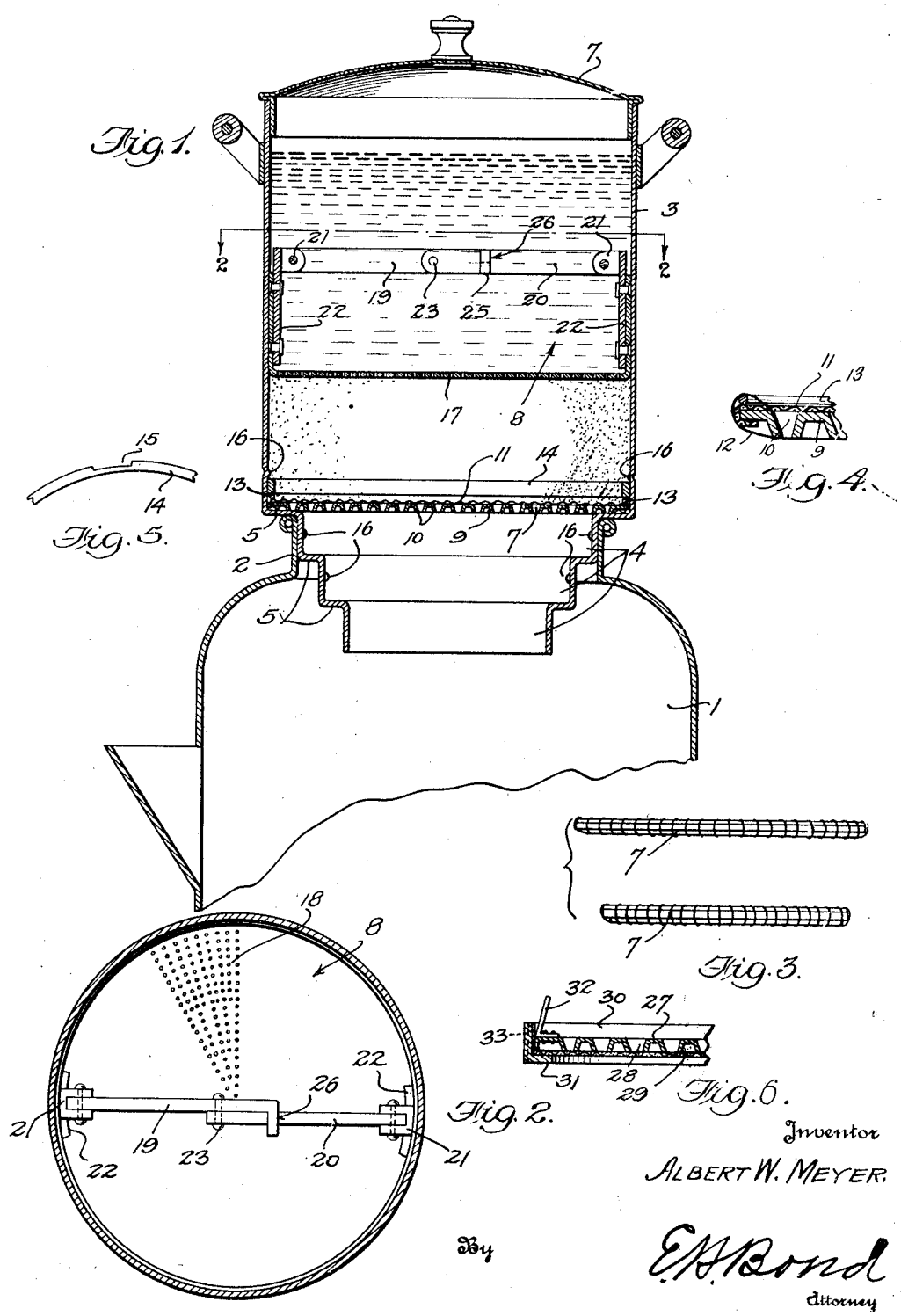
Inventor
ALBERT W. MEYER.
By
E. H. Bond
Attorney Patented Dec. 15, 1931

1,836,541

UNITED STATES PATENT OFFICE

ALBERT W. MEYER, OF NEW YORK, N. Y.

PERCOLATOR

Application filed May 19, 1930. Serial No. 453,773.

This invention relates to coffee percolators and more particularly to a percolating device constituting an attachment adapted to be applied to a coffee pot of a conventional construction.

An object of the invention is to provide a percolating device so constructed that it may be applied to coffee pots having necks of different diameters and thereby allow the device to be used in connection with either a large or small coffee pot.

Another object of the invention is to not only allow the attachment to be applied to large or small coffee pots but also permit a coffee support to be disposed in selected spaced relation to the lower end of the receptacle according to the amount of coffee to be used.

Another object of the invention is to provide an improved type of coffee support so constructed that it will be very efficient in operation and permitted to be easily cleaned.

Another object of the invention is to provide an improved water strainer adjustable vertically within the body of the percolator and having improved means for releasably securing the strainer in a set position within the body.

The invention is illustrated in the accompanying drawings wherein:

Fig. 1 is a vertical sectional view through the improved percolator.

Fig. 2 is a transverse sectional view taken along the line 2—2 of Fig. 1.

Fig. 3 shows edge views of the coffee support adapted to be set into the body of the percolator in place of the one shown in Fig. 1.

Fig. 4 is an enlarged fragmentary view of one of the coffee supports.

Fig. 5 is a fragmentary view of a retainer ring for the coffee support.

Fig. 6 is a fragmentary sectional view of a modified form of coffee support.

This improved coffee percolator attachment is intended for use in connection with a coffee pot 1 of any size, and when in place fits within the neck 2 of the coffee pot. In order to permit the percolator to fit within coffee pot necks of different diameters, the lower portion of its body 3 is successively reduced in diameter thereby forming supporting necks 4 united by collars 5 which define inner and outer annular shoulders. The upper and lower ends of the body are open, and in order to close the upper end of the body there has been provided a cover 6.

Coffee is to be supported in the body between a perforated coffee support 7 and water strainer 8 so that water poured into the percolator may trickle through the coffee without displacing the coffee. By this arrangement the water will pass slowly through the coffee and extract full strength therefrom and since the coffee is not disturbed by water poured into the percolator, the coffee will be very clear. The strainer is adjustable in the body or receptacle 3 and coffee supports corresponding in number to the shoulders or ledges 5 are provided. These supports are of different sizes and each fits upon a corresponding ledge of the body. Therefore a coffee support may be disposed either close to the lower end of the body or at a greater distance above the same according to the amount of coffee to be used and the strainer then set into the receptacle so that it rests upon the coffee and firmly secured in a set position.

The coffee supports may be formed as shown in Fig. 4 or as shown in Fig. 6. In the form shown in Fig. 4 the main disk 9 is formed of rigid metal and this disk is stamped from its upper surface to form detents 10 open at their ends and constituting downwardly tapered water passages. A sheet of fabric 11 is disposed against the upper face of the disk 9 with its marginal portions folded about margins of the disk and secured by thread 12 which also serves to hold a cord 13 in place. The cord serves as a packing against which rests a securing ring 14 serving to hold the coffee support in place upon the ledge. This ring is formed of rigid metal and is formed in its outer side face with diametrically opposed recesses 15 so that when the ring is set in place it may be pressed below lugs 16 and then turned to a position in which the lugs overlap the upper edge of the ring and retain it in close contacting engagement with the packing ring.

Therefore, the coffee support will be firmly held in place. In view of the fact that the water passages 10 taper downwardly, a suction is created which causes the water to flow freely through the coffee.

The water strainer 8 consists of a sheet metal cup which fits snugly into the body of the percolator and has its bottom 17 formed with small perforations as shown at 18 throughout its entire area. The walls of the cup are yieldable and when pressed into engagement with the walls of the receptacle have frictional engagement therewith in order to retain the strainer in a set position. In order to expand the cup there has been provided arms or bars 19 and 20 which extend diametrically across the cup, the outer ends of the arms being pivoted between bearing ears 21 at the upper ends of blocks or strips 22 secured against walls of the cup and the inner end of the arm 20 is pivoted in spaced relation to the inner end of the arm 19 by a pin or rivet 23. Therefore, the free inner end portion of the arm 19 constitutes a handle 24 by means of which the arms may be forced downwardly to an operative position in which they form portions of the cup into engagement with walls of the body and firmly hold the strainer in place. A finger 25 projects transversely from the handle so that the arms may be easily moved to a raised position and seats in a notch 26 formed in the arm 20 when the handle is swung downwardly in order to limit downward movement of the arms and insure proper pressure being applied.

The modified form of coffee support illustrated in Figure 6 includes a disk 27 corresponding to the disk 9 and having water passages 28 formed the same as the passages 10. This disk has its under face covered by a fabric sheet 29 to hold back fine coffee and in order to bind the sheet against the disk there is employed a ring 30 which fits tightly about the disk and marginal portions of the sheet with its flange 31 pressing the sheet firmly against the disk. A tongue 32 extends upwardly from the disk so that the ring and disk may be easily separated. When this form of coffee support is used a separate retainer ring 14 is not necessary as the ring 30 will take its place and may be formed with notches 33 to receive the lugs 16.

When the percolator is in use the lower end of the receptacle or body is fitted into the neck of the coffee pot and a selected coffee support fitted into the lower portion of the receptacle. A suitable quantity of coffee is poured in upon the support and after the coffee has been evenly distributed the strainer is set in place flat upon the coffee and the arms 19 and 20 forced downwardly into position to secure the strainer. Water is now poured into the receptacle and will pass through the perforations 18 in fine streams and trickle through the coffee and its support without disturbing the coffee. Therefore, the coffee when made will be very clear and free from sediment.

Perforated metal or fabric, as may be desired, may be used for the bottoms of the receptacles.

Various modifications in detail may be resorted to without departing from the spirit of the invention.

What I claim as new and desire to secure by Letters Patent is:

1. A percolator for coffee pots comprising a body open at its top and bottom and adapted to have its lower portion set into a coffee pot, a coffee support in said body consisting of a rigid disk having portions struck downwardly to form openings, a sheet of fabric fitting against said disk and having its marginal portions folded about marginal edges of the disk, a detachable securing ring fitting about said disk and engaging the folded marginal partitions of the sheet to secure the sheet firmly against the disk and a strainer fitted into said body and secured in a set position above said coffee support.

2. A percolator for coffee pots comprising a body open at its top and bottom and adapted to have its lower portion set into a coffee pot, a coffee support in said body consisting of a rigid disk having perforations formed therein, and a sheet of fabric fitting against said disk with its marginal portions folded about edge portions of the disk, a cushioning cord extending about margins of the sheet and disk, a thread for firmly securing the cord and sheet to the disk sewed through the disk and sheet and extending across the thread transversely thereof, a ring removably secured in said body and bearing against said cord to retain the coffee support in place, and a strainer fitted into said body and secured in a set position above said coffee support.

3. A percolator for coffee pots comprising a body open at its top and bottom and adapted to have its lower portion fitted into a coffee pot, a perforated coffee support in said body, and a water strainer in said body serving as means to confine coffee against the coffee support, said strainer consisting of a cup having a perforated bottom and yieldable walls disposed close to walls of the body, and a handle for said strainer connected with the walls thereof and adapted to expand the walls of the cup into tight binding engagement with the walls of the body and secure the strainer in a set position within the body.

4. A percolator for coffee pots comprising a body open at its top and bottom and adapted to have its lower portion fitted into a coffee pot, a perforated coffee support in said body, and a water strainer in said body serving as means to confine coffee against the coffee support, said strainer consisting of a cup having a perforated bottom and yieldable walls disposed close to walls of the body, blocks secured against the walls of the cup in diametrically opposed relation to each other, and spreader bars pivoted at their outer ends to said blocks and one having its inner end pivoted to the inner end of the other and projecting therefrom to form a handle whereby the bars may be moved to expand the walls of the cup into tight binding engagement with the walls of the body and secure the strainer in a set position within the body.

In testimony whereof I affix my signature.

ALBERT W. MEYER.